Sept. 21, 1965 W. H. HIRONS 3,207,059
BACON FRYER
Filed Oct. 24, 1962 2 Sheets-Sheet 1
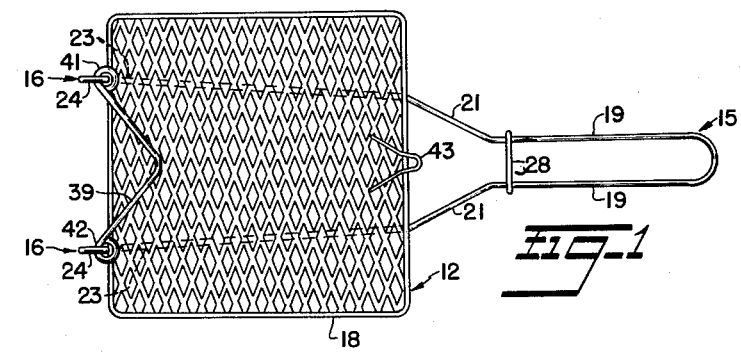
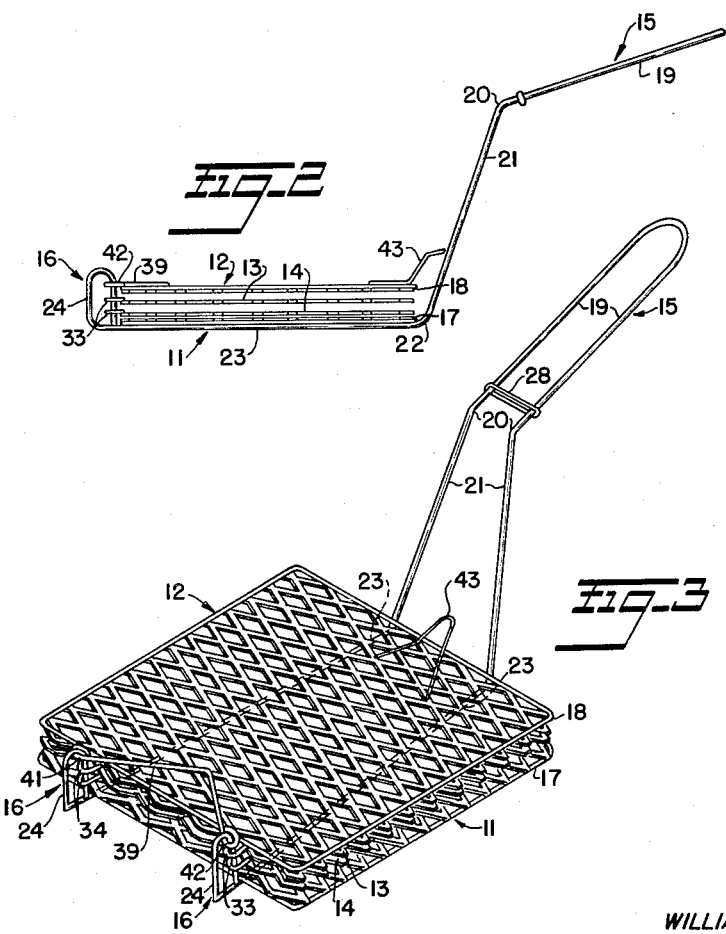
INVENTOR
WILLIAM H. HIRONS
BY
Strauch, Nolan & Neale
ATTORNEYS Sept. 21, 1965  W. H. HIRONS  3,207,059
BACON FRYER
Filed Oct. 24, 1962  2 Sheets-Sheet 2
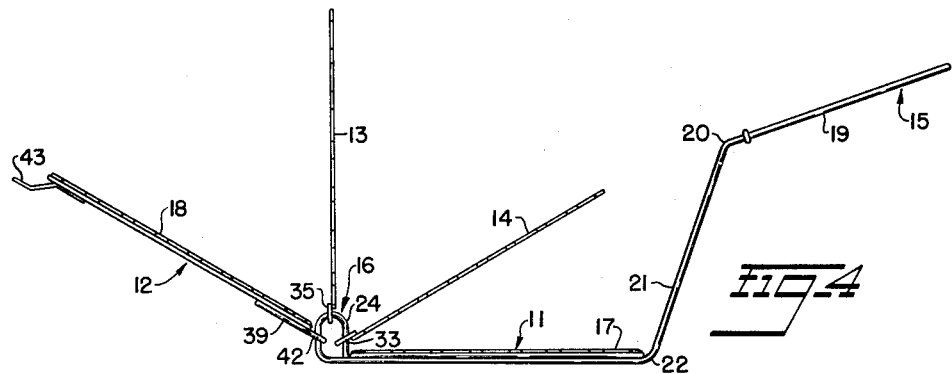
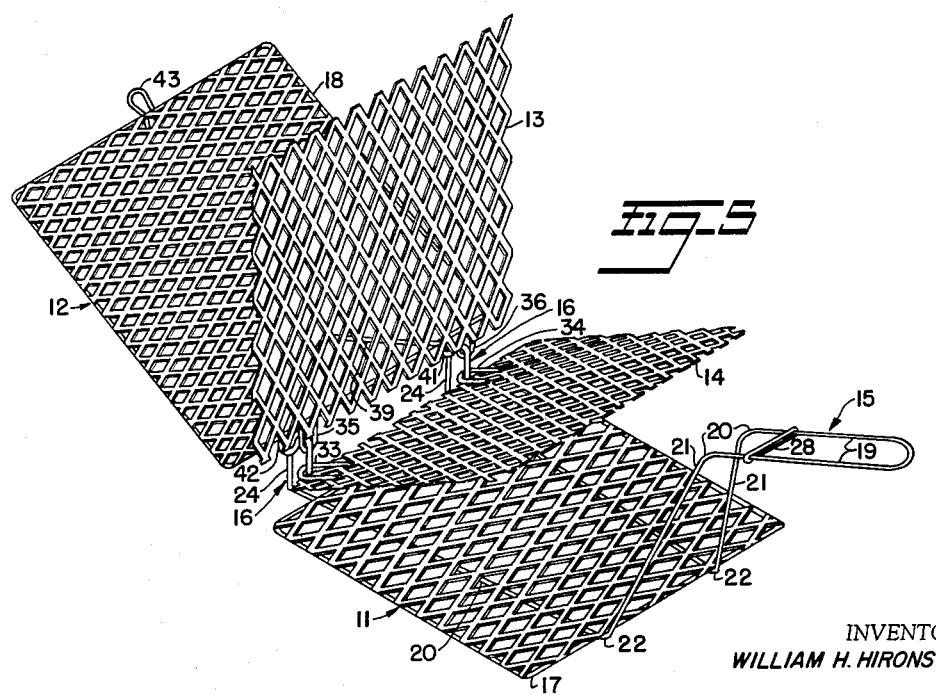
INVENTOR
WILLIAM H. HIRONS
BY
ATTORNEYS

United States Patent Office 3,207,059
Patented Sept. 21, 1965

3,207,059
BACON FRYER
William H. Hirons, Apt. 1, Royal Courts, Pampa, Tex.
Filed Oct. 24, 1962, Ser. No. 232,783
6 Claims. (Cl. 99—349)

The present invention relates to a cooking utensil and more particularly to a foraminous deep fat frying utensil or basket for cuts of meat that tend to shrink and curl when fried in pans or on grill plates and like conventional utensils.

Generally, pieces of meat are fried on top of a hot metal plate or griddle. If the meat contains a relatively large amount of fat or tendons along the edges, it is difficult to fry without shrinkage and curling. A strip of bacon, pan fried steak, ham steaks and like meat cuts often twist, curl and shrink substantially when pan or grill fried with the result that hotel and restaurant servings lack the customer appeal desired and often include unevenly cooked meat courses.

If the meat is fried slowly upon a griddle or grill plate that has a relatively low temperature, the amount of shrinkage can be reduced. However, frying at a low temperature takes precious time that is not available in the hotel and restaurant trade, does not avoid curling and uneven cooking of the meat and necessitates close attention of the cook in turning the many individual meat cuts undergoing the cooking process at the same time to assure even cooking and avoid surface burning at the contact points between the curled meat and griddle or grill plate surface.

In a commercial or institutional kitchen, for example, a large number of thin pieces of meat, bacon, ham, hamburgers, sausage, or the like must be cooked simultaneously and as quickly as possible. Using cooking utensils presently available in the art, it has been impossible to properly pan or grill cook a large number of pieces of meat properly and speedily without undesired shrinking, curling and spot charring.

Therefore, it is the principal object of the present invention to provide a foraminous meat cooking utensil for simultaneously cooking many thin pieces of meat evenly and speedily without unduly shrinking and curling the individual meat cuts.

Another object is to provide a foraminous multi-leaved cooking utensil for deep fat frying of meat that is economical to manufacture and easy to use.

Still another object is to provide a foraminous multi-leaved cooking utensil for deep fat cooking of meat which has a rugged main frame and cover construction serving to weight the meat and clamp it therebetween and yet is relatively light and easy to handle.

A further object is to provide a foraminous cooking utensil that is composed of top and bottom cover frame elements and a plurality of leaves arranged to open and close like a book, the leaves being hinged so that their relative closed positions are readily variable for ensuring that the leaves rest squarely and fully upon pieces of meat which have been inserted between the leaves to be cooked.

Still another object is to provide a light weight, multi-leaved, cooking utensil that has a foraminous base plate, a foraminous cover plate, and at least one foraminous intermediate plate for receiving therebetween a number of meat cuts for immersion in hot fat or cooking oils to effect cooking without shrinking and curling the meat; and a simple and inexpensive unitary handle element formed to support the base plate and provide hinge formations for freely hinging the cover and intermediate plates relative to the base plate.

Still another object is to provide a foraminous bacon fryer for deep fat frying a large number of strips of bacon rapidly with minimum shrinkage and maximum retention of the bacon flavor, the fryer being constructed to grip the strips of bacon and having a rugged construction simple and safe to use and easy to clean.

Still another object is to provide a foraminous fryer, including multiple intermediate gripper leaves, which can be used for immersing a large variety of meat cuts of various thicknesses, such as ham slices, hamburger patties, calf fries, chicken fries, veal cutlets, etc. in deep fat or cooking oil for cooking quickly with little shrinkage and loss of flavor.

In accordance with the present invention, the foregoing objects are achieved by a cooking utensil which comprises an openwork rimmed base plate, an openwork rimmed cover plate, at least one openwork intermediate leaf plate. A run of relatively heavy gage wire encircles and forms the rims of the cover and base plates. An additional run of heavy gage wire is shaped into a combined handle, strut type support for the base plate and hinge means for hinging the cover and intermediate plates relative to the base plate. Pieces of meat to be fried are layered between the base plate, the intermediate leaves and the cover of the utensil, and are gripped therebetween to keep the meat from slipping free and shrinking during cooking by the weight of the cover plate and the superjacent leaves. The utensil is adapted to be immersed into a deep fat container for frying the meat while it is held securely between the leaves.

The achievement of the above objects of the invention as well as other objects and advantages will become apparent from the following description when read in conjunction with the appended claims and accompanying drawings wherein:

FIGURE 1 is a top plan view illustrating a multi-leaved cooking utensil constructed in accordance with a preferred embodiment of the present invention;

FIGURE 2 is a side elevational view of the cooking utensil illustrated in FIGURE 1 and shows the leaves of the utensils in their closed positions;

FIGURE 3 is a slightly enlarged perspective view of the cooking utensil illustrated by the previous figures, and shows the leaves of the utensil in their closed positions;

FIGURE 4 is a side elevational view of the cooking utensil and shows the leaves of the utensil in their open positions; and FIGURE 5 is a further perspective view of the cooking utensil and showing the leaves in their open positions.

With continued reference to the drawings wherein like parts throughout the several figures of the drawings are identified by the same reference numeral, the foraminous multi-leaved cooking utensil is illustrated as being composed of an openwork base plate 11, an openwork cover plate 12, a pair of openwork intermediate plates 13 and 14 and a wire handle and support structure 15 which also provides hinge formations 24 for the intermediate plates and cover. The plates 11–14 as shown, have rectangular configurations. The cover plate 12 and the intermediate plates 13 and 14 open and close relative to the base plate 11 like the leaves of a book, the intermediate leaves being dimensioned to lie within the boundaries of the base plate and cover.

Each openwork plate contains a network of ovate openings or meshes. In one actual embodiment of the invention, each of plates 11, 12, 13 and 14 is made from a body of expanded steel that forms an openwork or foraminous plate having a five-eighth inch by one inch open mesh. The mesh openings of the plates preferably have the same dimensions to ensure cooking uniformity of pieces of meat that are placed between the plates or leaves. While in the illustrated embodiment the plates are made from expanded steel, it is to be understood that interwoven welded wire mesh or punched sheet metal plate constructions would serve equally well.

Encircling the underface of base plate 11 is a continuous run of relatively heavy gage wire 17 brazed to the peripheral edges of the expanded metal body of plate 11. Encircling the upper face of cover plate 12 is a similar continuous run of relatively heavy gage wire 18 brazed to the peripheral edges of the expanded metal body of plate 12. The intermediate plates or leaves 13 and 14 fit just inside the run of wire 17 when the leaves 13 and 14 are in their closed positions. In the actual embodiment referred to above, the encircling wires 17 and 18 were made from a steel rod having a gage of three-sixteenths of an inch. This gage, being much heavier than the gage of the metal that is used to form the meshes of the plates 11, 12, 13 and 14, imparts extreme rigidity to the base and cover plates and a sufficient mass to the cover to assure a firm clamping of the meat cuts and intermediate leaves between the cover and base plates when the utensil is filled, closed and immersed in the hot fat or cooking oil.

In accordance with an important feature of the invention, the handle and support structure 15 comprises a continuous run of relatively heavy gage metal wire (three-sixteenths of an inch in the actual embodiment referred to above) bent midway of its ends to form a hand hold portion having parallel arms 19 downwardly bent at 20 to form downwardly diverging spacer arms 21, the lower ends of which are in turn bent at 22 to form base plate support runs 23 which subjacently traverse the base plate 11 as illustrated. Support runs 23 are brazed at four intersecting points to the encircling run of wire 17 and their free ends are bent upwardly and around and downwardly to form a pair of elongated, vertically extending generally oval-shaped loop members 34. Loop members 24 project upwardly from one edge of the base plate 11 to serve as hinge loops for freely hinging intermediate plates 13 and 14 and the cover plate 12 relative to the base plate after the manner of a loose-leaf ring binder. A cross piece 28 extending between arms 19 braces the two sides of the closed handle portion.

The hinge structure for leaves 13 and 14 is completed by brazing to one edge of the intermediate plates a pair of laterally spaced eyelets 33 and 34 which slidingly receive the loop members 24, to hinge plates 13 and 14 relative to the base plate 11. In the actual embodiment of the invention referred to above, the eyelets 33 and 34 are made from one-eighth inch gage wire.

A generally V-shaped wire member 39 having a gage like that of wire 19, is brazed to the top hinge edge of the cover plate 12 and its two free ends are bent into eyelets 41 and 42 disposed beyond encircling wire 18 of the plate 12. Member 39 is brazed to wire 18 at the crossing points and to the wire mesh body of cover plate 12 at the neck of the V. The eyelets 41 and 42 receive the loop members 24 to hinge cover plate 12 relative to the base plate 11.

A U-shaped wire member 43, fastened to the opposite side edge of cover plate 12 in upstanding relation thereto by brazing the free legs of member 43 to the encircling wire 18 and the wire mesh of cover plate 12, provides a handle for opening and closing the plate 12.

In using the cooking utensil, plates 12, 13 and 14 are folded back away from the base plate 11 to expose the upper face of plate 11. Thin pieces of meat are then placed upon base plate 11 to substantially cover it. The intermediate plate 14 is then swung about the hinge members 24 to a level rest position on top of the meat on plate 11. More pieces of meat are placed on plate 14 to fill it. The plate 13 is then swung to a level rest position on top of the meat on plate 14, and additional pieces of meat are placed on plate 13. After plate 13 is filled, the cover plate 12 is swung to a level rest position on top of the meat on plate 13, and the utensil is ready to be used. From this description it will be obvious that a large number of pieces of meat of varying kinds, depending solely upon the size of the leaves and their number, which is a matter of choice, can be introduced into the cooker of the present invention. Necessarily, meat pieces of the same thickness are interleaved between the same pair of plate members to assure proper gripping of each piece to minimize shrinkage and avoid curling.

Since the intermediate leaves 13 and 14 are relatively light, they are easy to manipulate in loading. The cover plate 12, which is encircled by the relatively heavy run of wire 18, is easily swung on the oval shaped hinge members 24 by the handle 43. The weight of the cover plate 12 with its wire rim 18 is sufficient to ensure that the pieces of meat are held firmly in place between the respective pairs of leaves.

Moreover, the utensil readily accommodates pieces of meat having one thickness or pieces having different thicknesses when used as explained above. The elongated, vertically extending hinge members 24 ensure this result by providing a vertically elongated run in the hinge loop permitting the spacing between leaves to be selectively adjusted in accord with the meat thickness so each layer of meat is evenly and firmly gripped.

After loading the utensil and closing the cover plate 12, the pieces of meat are ready to be immersed in the hot fat or oil and cooked. This is accomplished by immersing the plate portion of the utensil and the meat in the hot cooking fat or oil, the handle portions 19 being grasped to accomplish the immersion. While the meat is cooking, the leaves 13 and 14 in cooperation with base 11 and cover 12 hold it in place, the hot grease circulates in full contact with the exposed meat surfaces searing the exposed surfaces and sealing in and preventing egress of the juices thereby minimizing shrinkage and loss of the individual meat flavors. After the meat is cooked, the utensil is removed from the hot cooking fat or oil, permitted to drain momentarily and the cooked meat is readily removed from the utensil. In using the utensil, hamburger patties, for example, are cooked in fifty seconds without curl, shrinkage, or loss in flavor.

In addition to the advantages in frying meat that are achieved by the present cooking utensil over previously known apparatus, the present utensil eliminates the hazard of grease-flooded grills which frequently cause dangerous fire hazards.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent is:

1. A cooking utensil for deep fat frying bacon comprising a heavy wire mesh base plate; wire mesh cover plate; at least one intermediate wire mesh plate, all of said plates having substantially the same dimensions; an encircling rim of wire attached to the peripheral edge of each of said base and cover plates only, the gage of said rim of wire being heavier than the gage of the wire forming the meshes of said plates; a combined handle and support member comprising a continuous run of heavy gage wire formed intermediate its ends into a handle loop that has a downwardly directed portion, said support portion being terminated in a support portion fixed to the bottom of said base plate, and providing at one side of said base plate a pair of vertically elongated upstanding loops, and means fixed to said intermediate and cover plates and slidingly cooperating with said elongated loops for hinging said plates to said base plate.

2. A cooking utensil for deep fat cooking comprising a foraminous base plate, a foraminous cover plate, at least one foraminous intermediate plate, all of said plates being of substantially the same dimensions, handle means fixed to said base plate and extending generally upwardly past one edge and outwardly therefrom, and means for securing said plates in operative association so that said cover and intermediate plates open and close relative to the base plate like the leaves of a book yet are respectively freely movable toward or away from each other to grippingly accommodate a layer of meat of the same thickness between one pair of adjoining plates and a layer of meat of a substantially different thickness between another pair of adjoining plates, said securing means comprising a pair of spaced parallel upwardly elongated rigid loop means fixed at one edge of said base plate, the planes of said loop means being perpendicular to the said one edge of said base plate, said securing means including cooperating laterally spaced elements fixed to the edge portions of said intermediate and cover plates and each slidingly connected to one of said loop means.

3. A cooking utensil for deep fat cooking of meat cuts and strips comprising a foraminous base plate, a foraminous cover plate, at least one foraminous intermediate plate, all of said plates being of expanded metal and of substantially the same dimensions, handle means fixed to said base plate and extending generally upwardly past one edge thereof and outwardly therefrom, a pair of spaced parallel vertically extending guide rods fixed to one edge of said base plate, said guide rods being curved outwardly and downwardly at their upper ends, a pair of spaced outwardly and laterally extending eyelet means affixed to an edge of each said cover and intermediate plates, said guide rods passing through said eyelet means to form a loose hinge connection mounting said cover and intermediate plates for selectively varying the distance between said plates to accommodate layers of meat of different thicknesses in gripping contact between adjoining pairs of plates.

4. The utensil of claim 3, wherein said pair of guide rods are formed by the terminal ends of respective continuous base plate runs of heavy gage wire extending subjacently across said base plate and bent upwardly to extend upwardly past the opposite base plate edge and then outwardly to form a handle portion.

5. A cooking utensil comprising a foraminous base plate, a foraminous cover plate, at least one foraminous intermediate plate disposed between said base and cover plates, said plates having substantially the same dimensions and same size mesh openings, a continuous run of relatively heavy gage wire shaped to form spaced support arms subjacently fixed to said base plate and terminating at one edge of said base plate in a pair of spaced vertically elongated loop members upstanding from the said edge of said base plate and terminating beyond the opposite edge of said base plate in an upstanding outwardly directed handle for manipulating said utensil, said cover and intermediate plates along adjacently related edges having hinge eyes affixed thereto, each of said loop members passing through a hinge eye on said cover and intermediate plates.

6. A cooking utensil comprising a foraminous base plate, a foraminous cover plate, at least one foraminous intermediate plate disposed between said base and cover plates, all of said plates having substantially the same dimensions and same size mesh openings, an encircling rim of heavy gage wire attached to the peripheral edge of each of said cover and base plates only, the diameter of said wire being greater than the thickness of its respective plate, a pair of spaced parallel vertically extending guide rods affixed to one edge of said base plate, said guide rods being curved outwardly and downwardly at their upper ends, a pair of spaced laterally outwardly extending guide elements fixed to the edge portions of said cover and intermediate plates, said guide rods passing loosely through said guide elements to form a loose hinge connection mounting said cover and intermediate plates for selectively varying the distance between said plates to accommodate layers of food of different thicknesses in gripping contact between adjoining pairs of plates, and a handle for said utensil affixed to said base plate at its edge opposite to said guide rods, and extending upwardly and outwardly from the edge of said base plate.

References Cited by the Examiner

UNITED STATES PATENTS

| | | | |
|---|---|---|---|
| 223,929 | 1/80 | Lamont | 220—95 X |
| 244,060 | 7/81 | Johnson et al. | 99—402 |
| 914,159 | 3/09 | McCaughey | 99—402 X |
| 1,201,704 | 10/16 | Davite | 99—402 X |
| 1,648,335 | 11/27 | Cole | 99—374 |
| 1,699,221 | 1/29 | Carter | 99—355 X |
| 1,783,792 | 12/30 | Isaacson | 99—349 X |
| 2,469,595 | 5/49 | Foster | 99—374 |
| 2,542,109 | 2/51 | Benson | 99—402 X |
| 2,868,112 | 1/59 | Bushway | 99—410 |
| 2,895,406 | 7/59 | Randolph | 99—426 X |
| 3,019,721 | 2/62 | Haapala | 99—349 |

ROBERT E. PULFREY, *Primary Examiner.*

JEROME SCHNALL, *Examiner.*